(12) United States Patent
Su et al.

(10) Patent No.: US 10,916,769 B2
(45) Date of Patent: Feb. 9, 2021

(54) CATHODE, ELECTROCHEMICAL DEVICE AND ELECTRONIC DEVICE COMPRISING SAME

(71) Applicant: NINGDE AMPEREX TECHNOLOGY LIMITED, Ningde (CN)

(72) Inventors: Xinru Su, Ningde (CN); Baozhang Li, Ningde (CN); Yisong Su, Ningde (CN); Zhiwen Xiao, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 29 days.

(21) Appl. No.: 16/298,738

(22) Filed: Mar. 11, 2019

(65) Prior Publication Data

US 2020/0144605 A1    May 7, 2020

(30) Foreign Application Priority Data

Nov. 5, 2018  (CN) .......................... 2018 1 1308841

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/136* (2013.01); *H01M 4/525* (2013.01);
(Continued)

(58) Field of Classification Search
CPC ........... H01M 10/052; H01M 10/0525; H01M 10/0587; H01M 10/4235;
(Continued)

(56) References Cited

U.S. PATENT DOCUMENTS

2004/0202928 A1    10/2004  Miyamoto et al.
2006/0115736 A1     6/2006  Hashimoto et al.
(Continued)

FOREIGN PATENT DOCUMENTS

EP    2876711 A1    5/2015
JP    2013051040 A  3/2013

OTHER PUBLICATIONS

Extended European Search Report dated Mar. 12, 2020 in counterpart European application 19207088.6, 7 pages.

*Primary Examiner* — Victoria H Lynch
(74) *Attorney, Agent, or Firm* — Morgan, Lewis & Bockius LLP

(57) ABSTRACT

The present application relates to a cathode, an electrochemical device and an electronic device including the same. The cathode includes: a cathode current collector, a first cathode active material layer, a second cathode active material layer and an insulating layer; where the first cathode active material layer covers a first portion of a first surface of the cathode current collector, and the insulating layer covers a second portion of the first surface of the cathode current collector that is different from the first portion, where a first distance exists between the insulating layer and the first cathode active material layer in a longitudinal direction of the cathode current collector. By providing a gap between the active material layer in a two-layer structure and the insulating layer in the cathode, the potential problem of the overlapping of the active material layer in a two-layer structure and the insulating layer on the cathode is alleviated, thereby ensuring that the electrochemical device cannot catch fire and lead to failure in the event of being punctured, and further ensuring the mechanical safety performance of the electrochemical device.

19 Claims, 4 Drawing Sheets

(51) Int. Cl.
  *H01M 4/136* (2010.01)
  *H01M 4/525* (2010.01)
  *H01M 4/58* (2010.01)
  *H01M 4/62* (2006.01)
  *H01M 4/66* (2006.01)
  *H01M 10/0525* (2010.01)
  *H01M 4/02* (2006.01)

(52) U.S. Cl.
  CPC ......... *H01M 4/5825* (2013.01); *H01M 4/623* (2013.01); *H01M 4/625* (2013.01); *H01M 4/667* (2013.01); *H01M 10/0525* (2013.01); *H01M 2004/028* (2013.01)

(58) Field of Classification Search
  CPC .. H01M 2004/028; H01M 4/13; H01M 4/131; H01M 4/136; H01M 4/366; H01M 4/525; H01M 4/5825; H01M 4/623; H01M 4/625; H01M 4/667
  See application file for complete search history.

(56) References Cited

U.S. PATENT DOCUMENTS

| | | | |
|---|---|---|---|
| 2012/0058375 | A1 | 3/2012 | Tanaka et al. |
| 2015/0147624 | A1* | 5/2015 | Yamafuku ......... H01M 10/0585 429/121 |
| 2016/0093859 | A1 | 3/2016 | Kawaguchi et al. |
| 2016/0294015 | A1* | 10/2016 | Tanaka .............. H01M 10/0585 |

\* cited by examiner

CATHODE, ELECTROCHEMICAL DEVICE AND ELECTRONIC DEVICE COMPRISING SAME

CROSS REFERENCE TO RELATED APPLICATIONS

The present application claims the benefit of priority from the China Patent Application No. 201811308841.3, filed on 5 Nov. 2018, the disclosure of which is hereby incorporated by reference in its entirety.

BACKGROUND

1. Field of the Invention

Embodiments of the present application relate to the field of electrochemical devices, and more particularly, to a cathode and a lithium-ion battery.

2. Description of the Related Art

Electrochemical devices (for example, lithium-ion batteries) have entered our daily lives with advances in technology and environmental protection. With the large-scale popularization of lithium-ion batteries, safety problems caused by an external force puncturing lithium-ion batteries occasionally occur on the user side, and their safety performance has received more and more attention. In particular, the numerous incidents of battery fermentation in some mobile phones resulting in explosions has caused users, resellers and lithium-ion battery manufacturers to put forward new requirements for the safety performance of lithium-ion batteries.

At present, the methods for improving the safety of lithium-ion batteries comes at the expense of the energy density of lithium-ion batteries. Therefore, it is imperative to provide a technical means capable of significantly improving the safety performance of lithium-ion batteries while realizing higher energy density in them.

SUMMARY

The embodiments of the present application are directed to a cathode. A region covered by an active material layer on the cathode current collector of the cathode adopts an active material layer in a two-layer structure, and a region not covered by the active material layer is provided with an insulating layer. By adjusting the gap between the active material layer and the insulating layer, the overlapping problem that may occur when the active material layer and the insulating layer are disposed can be effectively alleviated, and a failure caused by an internal short circuit generated when the electrochemical device is pierced by an external force is avoided, thereby effectively improving the safety performance of the electrochemical device in a penetration test.

Some embodiments of the present application provide a cathode, including a cathode current collector, a first cathode active material layer, a second cathode active material layer and an insulating layer, where the first cathode active material layer includes a first cathode active material, and the second cathode active material layer includes a second cathode active material. The cathode current collector has a first surface, where the first cathode active material layer is disposed between the cathode current collector and the second cathode active material layer and covers a first portion of the first surface of the cathode current collector, and the insulating layer covers a second portion of the first surface of the cathode current collector that is different from the first portion.

According to some embodiments of the present application, a first distance exists between the insulating layer and the first cathode active material layer in a longitudinal direction of the cathode current collector, a second distance exists between the insulating layer and the second cathode active material layer in the longitudinal direction of the cathode current collector; and the first distance and the second distance are respectively greater than or equal to 0 and the second distance is less than or equal to the first distance.

According to some embodiments of the present application, the second cathode active material layer completely covers the surface of the first cathode active material layer.

According to some embodiments of the present application, the first distance is from about 0 mm to about 83 mm.

According to some embodiments of the present application, the thickness of the first cathode active material layer is from about 0.1 µm to about 20 µm.

According to some embodiments of the present application, the thickness of the insulating layer is greater than the thickness of the first cathode active material layer.

According to some embodiments of the present application, the first cathode active material and the second cathode active material are each independently selected from the group consisting of lithium cobaltate, lithium iron phosphate, lithium manganese iron phosphate, sodium iron phosphate, lithium vanadium phosphate, sodium vanadium phosphate, oxy-lithium-vanadium phosphate, oxy-sodium-vanadium phosphate, lithium vanadate, lithium manganate, lithium nickelate, lithium nickel cobalt manganese oxide, lithium-rich manganese-based material, lithium nickel cobalt aluminum oxide, lithium titanate and combinations thereof.

According to some embodiments of the present application, the first cathode active material layer and the second cathode active material layer respectively further include a binder and a conductive agent, wherein the binder is selected from the group consisting of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene butadiene rubber and combinations thereof, and the conductive agent is selected from the group consisting of carbon nanotubes, conductive carbon black, acetylene black, graphene, Ketjen black, carbon fibers and combinations thereof.

According to some embodiments of the present application, the insulating layer includes at least one of inorganic particles and a polymer, where the inorganic particles are selected from the group consisting of aluminum oxide, silicon dioxide, magnesium oxide, titanium oxide, hafnium oxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide, barium sulfate and combinations thereof, and the polymer is selected from the group consisting of a homopolymer of vinylidene fluoride, a copolymer of vinylidene fluoride, a copolymer of hexafluoropropylene, polystyrene, polyphenylacetylene, sodium poly(vinyl acid), potassium poly(vinyl acid), polymethyl methacrylate, polyethylene, polypropylene, polytetrafluoroethylene and combinations thereof.

Some embodiments of the present application provide an electrochemical device, including a anode, a separator and a cathode, where the cathode includes a cathode current collector, having a first surface; a first cathode active material layer, including a first cathode active material; a second cathode active material layer, including a second cathode active material; and an insulating layer, where the first cathode active material layer is disposed between the cathode current collector and the second cathode active material layer and covers a first portion of the first surface of the cathode current collector, and the insulating layer covers a second portion of the first surface of the cathode current collector that is different from the first portion; and the separator is disposed between the anode and the cathode, and the anode, the separator, and the cathode are wound to form an electrode assembly.

According to some embodiments of the present application, a first distance exists between the insulating layer and the first cathode active material layer in the longitudinal direction of the cathode current collector, a second distance exists between the insulating layer and the second cathode active material layer in the longitudinal direction of the cathode current collector; and the first distance and the second distance are respectively greater than or equal to 0 and the second distance is less than or equal to the first distance.

According to some embodiments of the present application, the first distance and the second distance are disposed at a corner of the electrode assembly.

According to some embodiments of the present application, the thickness D of the electrode assembly is from about 1.5 mm to about 50 mm.

According to some embodiments of the present application, the first distance between the insulating layer and the first cathode active material layer in the longitudinal direction of the cathode current collector satisfies the following formula:

$$0 \leq \text{the first distance} \leq \frac{\pi}{2}D + 4 \text{ mm.}$$

According to some embodiments of the present application, the second distance between the insulating layer and the second cathode active material layer in the longitudinal direction of the cathode current collector satisfies the following formula:

$$0 \leq \text{the second distance} \leq \frac{\pi}{2}D + 4 \text{ mm.}$$

Some embodiments of the present application provide an electronic device, including the electrochemical device in the above embodiments.

BRIEF DESCRIPTION OF THE DRAWINGS

The drawings that are necessary to describe the embodiments of the present application or the prior art will be briefly described below to facilitate the descriptions of the embodiments of the present application. Obviously, the drawings of the following descriptions are only partial embodiments of the present application. For those skilled in the art, the drawings of other embodiments can still be obtained according to the structures illustrated in the drawings without the need for creative labor.

DETAILED DESCRIPTION

Figure 1:
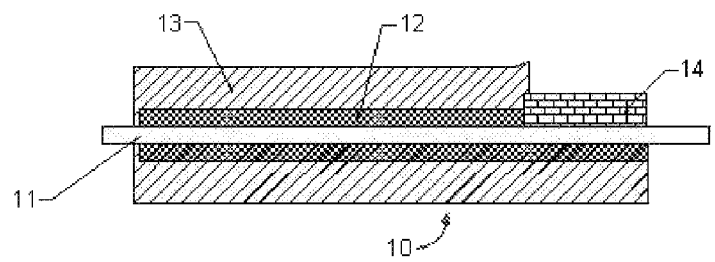
FIG. 1 is a schematic structural view of a cathode in which an active material layer and an insulating layer overlap according to some embodiments of the present application.

Embodiments of this application are described below in detail. Throughout the entire specification of this application, same or similar components or components having same or similar functions are represented by using similar reference numerals. The embodiments related to the accompanying drawings that are described herein are illustrative and schematic, and are used to provide basic understanding for this application. The embodiments of this application should not be construed as limitations to this application.

In this specification, unless otherwise particularly indicated or limited, relativistic wordings such as "central", "longitudinal", "lateral", "front", "back", "right", "left", "inner", "outer", "relatively low", "relatively high", "horizontal", "vertical", "higher than", "lower than", "above", "below", "top", "bottom", and derived wordings thereof (such as "horizontally", "downward", and "upward") should be construed as referenced directions described in discussion or shown in the accompanying drawings. These relativistic wordings are merely for ease of description, and require constructing or operating this application in a particular direction.

In addition, amounts, ratios, and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

Further, for convenience of description, "first", "second", "third" and the like may be used herein to distinguish different components of one drawing or series of drawings. Unless otherwise specified or limited, "first", "second", "third" and the like are not intended to describe the corresponding components.

As used herein, the term "about" is used for describing and explaining a small variation. When being used in combination with an event or a case, the terms can refer to an example in which the event or case exactly occurs, or an example in which the event or case similarly occurs. For example, when being used in combination with a value, the terms may refer to a variation range being less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

The embodiments of the present application provide a cathode. An active material layer in a region covered by a cathode active material layer is in a two-layer structure, and a region not covered by the cathode active material layer is provided with an insulating layer. By adjusting the gap between the active material layer and the insulating layer, the problem of damage to the cathode due to the overlapping of the active material layer and the insulating layer is alleviated, so that the contact resistance between the cathode current collector and the anode active material layer can be effectively enhanced when the cathode is damaged by an external force, thereby enhancing the safety performance of the lithium-ion battery in the corresponding test (i.e., nail penetration test).

Lithium-ion batteries usually have four types of short-circuit events during the nail penetration test where the layers are comprised: a cathode active material layer-anode active material layer, a cathode active material layer-anode current collector, a cathode current collector-anode current collector, and a cathode current collector-anode active material layer. Among the four short-circuit events, the cathode current collector-anode active material layer short-circuit event is the most dangerous because the amount of energy released during this type of short-circuit event is greatest.

In an electrochemical device (e.g., a lithium-ion battery), the lithium-ion battery includes a cathode, a anode, a separator, an electrolytic solution and the like. The cathode includes a cathode current collector, a cathode active material layer and the like, where the cathode current collector includes a region not covered by the active material layer (also referred to as an uncovered foil region) in addition to the region covered by the active material layer. For example, when the electrode assembly of the lithium-ion battery is a wound electrode assembly, its uncovered foil region includes an outer layer region of the electrode assembly and an inner layer tab welding region of the electrode assembly.

In the region covered by the cathode active material layer, the cathode current collector may be protected by coating a cathode active material layer in a two-layer structure. However, during the nail penetration test, the cathode current collector of the uncovered foil region will come directly into contact with the nail, and the nail will electrically connect to the anode active material layer inside the electrode assembly to create a cathode current collector-anode active material layer or a cathode current collector-nail-anode active material layer short-circuit event. Therefore, by providing an insulating layer on the uncovered foil region, the uncovered foil region of the cathode current collector in the cathode can be effectively protected, thereby avoiding a cathode current collector-anode active material layer or a cathode current collector-nail-anode active material layer short-circuit event, where the higher the coverage of the insulating layer on the uncovered foil region of the cathode current collector, the more obvious the effect of avoiding a short circuit. However, since the thickness of the insulating layer is greater than the thickness of the first cathode active material layer on the bottom layer of the active material layer, when the second cathode active material layer is coated on the first cathode active material layer, the second cathode active material layer easily overlaps with the insulating layer due to fluctuations in processing tolerance, and the insulating layer covers above or below the second cathode active material layer.

FIG. 1 is a schematic structural view of a cathode in which an active material layer and an insulating layer overlap according to some embodiments of the present application. As shown in FIG. 1, the cathode 10 includes a cathode current collector 11, a first cathode active material layer 12, a second cathode active material layer 13 and an insulating layer 14. The first cathode active material layer 12 is disposed between the cathode current collector 11 and the second cathode active material layer 13 and covers a first portion on one surface of the cathode current collector 11, the insulating layer is disposed on a second portion on the surface not covered by the first cathode active material layer 12 in a longitudinal direction of the cathode current collector 11, where no gap exists between the insulating layer and the first cathode active material layer 12 in the longitudinal direction of the cathode current collector 11, and the insulating layer and the second cathode active material layer overlap in the longitudinal direction of the cathode current collector 11. The above technical solution can significantly improve the nail penetration test performance of the lithium-ion battery. However, since the thickness of the overlapping portion of the second cathode active material layer 13 and the insulating layer 14 is excessively large, the second cathode active material in the second cathode active material layer 13 may exceed the limit of its compaction density in the subsequent cold pressing step, so that the particles of the second cathode active material in the second cathode active material layer 13 are ruptured. The rupture of the second cathode active material may affect the intercalation and de-intercalation of lithium ions, resulting in undesirable phenomena such as low battery capacity of the electrode assembly and the like.

Some embodiments of the present application provide a cathode, which avoids the problem of overlapping caused by the poor design of the above cathode by setting the gap size between the cathode active material layer and the insulating layer.

Figure 2:
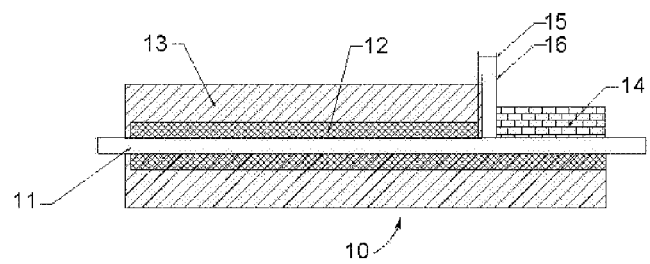
FIG. 2 is a schematic structural view of a cathode according to some embodiments of the present application.

FIG. 2 is a schematic structural view of a cathode according to some embodiments of the present application.

As shown in FIG. 2, the cathode 10 includes a cathode current collector 11, a first cathode active material layer 12, a second cathode active material layer 13 and an insulating layer 14. In particular, by adjusting the positions of the first cathode active material layer 12, the second cathode active material layer 13 and the insulating layer 14 in the longitudinal direction of the cathode current collector, a first distance 15 and a second distance 16 respectively exist between the first cathode active material layer 12 and the insulating layer 14 and between the second cathode active material layer 13 and the insulating layer 14, where the first cathode active material layer 12 is disposed between the cathode current collector 11 and the second cathode active material layer 13 and covers a first portion on one surface of the cathode current collector 11, and the insulating layer is disposed on a second portion of the surface not covered by the first cathode active material layer 12 in the longitudinal direction of the cathode current collector 11. A first distance 15 exists between the insulating layer 14 and the first cathode active material layer 12 in the longitudinal direction of the cathode current collector 11, a second distance 16 exists between the insulating layer 14 and the second cathode active material layer 13 in the longitudinal direction of the cathode current collector 11, and the first distance and the second distance are respectively greater than or equal to 0 and the second distance is less than or equal to the first distance. The arrangement of the first distance 15 and the second distance 16 effectively avoids the overlapping of the first cathode active material layer 12, the second cathode active material layer 13 and the insulating layer 14, thereby enhancing the reliability of the cathode in the preparation process, and lowering the possibility of a rupture of the second cathode active material in the second cathode active material layer 13 during the cold pressing technique.

In some embodiments of the present application, an end of the second cathode active material layer 13 in the longitudinal direction of the cathode current collector is longer than or equal to an end of the first cathode active material layer 12 in the longitudinal direction of the cathode current collector, so that the second cathode active material layer 13 completely covers the surface of the first cathode active material layer 12.

Figure 3:
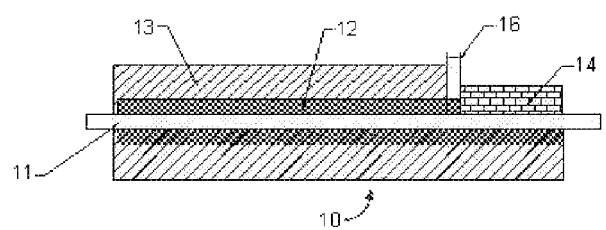
FIG. 3 is a schematic structural view of a cathode in which an end of a second cathode active material layer is shorter than an end of a first cathode active material layer according to some embodiments of the present application.

FIG. 3 is a schematic structural view of a cathode in which an end of a second cathode active material layer 13 is shorter than an end of a first cathode active material layer 12 according to some embodiments of the present application. As shown in FIG. 3, the end of the second cathode active material layer 13 in the longitudinal direction of the cathode current collector is shorter than the end of the first cathode active material layer 12 in the longitudinal direction of the cathode current collector, so that the tail end of the first cathode active material layer 12 in the longitudinal direction of the cathode current collector has an exposed portion not covered by the second cathode active material layer 13. The above technical solution can significantly enhance the nail penetration test performance of the lithium-ion battery. However, the exposed portion of the first cathode active material layer 12 causes the de-intercalation of lithium ions from the first cathode active material layer during charging, the de-intercalated lithium ions may form lithium metal particles on the anode current collector opposite the exposed portion, and the lithium metal particles increasingly intensify as the number of cycles of lithium-ion battery increases, thereby causing lithium metal particle pits to appear on the electrode assembly and lower storage capacity of the lithium-ion battery.

In some embodiments of the present application, the first distance is from about 0 mm to about 83 mm, which ensures the reliability of the cathode in the preparation process and does not lower the safety performance of the cathode in the nail penetration test. In some embodiments of the present application, the first distance is from about 6 mm to about 83 mm.

In some embodiments of the present application, the second distance is from about 0 mm to about 83 mm, which ensures the reliability of the cathode in the preparation process and does not lower the safety performance of the cathode in the nail penetration test. In some embodiments of the present application, the second distance is from about 6 mm to about 83 mm.

In some embodiments of the present application, the particle size of the cathode active material may be measured by a Malvern particle size tester: the cathode active material is dispersed in a dispersing agent (ethanol or acetone, or other surfactants), and after 30 mins of ultrasound, the sample is added to a Malvern particle size tester to start the test. In the volume-based particle size distribution of the first cathode active material, the particle diameter cumulated to 50% by volume of the small particle diameter (Dv50), i.e., the average particle diameter, in a range of from about 0.2 μm to about 15 μm, and in the volume-based particle size distribution of the first cathode active material, the particle diameter cumulated to 90% by volume of the small particle diameter (Dv90) in a range of less than or equal to about 40 μm. The first cathode active material having a smaller Dv90 enables higher coverage and adhesion to the cathode current collector 11, where the coverage is the total coated area of the region to be coated minus the exposed area of the layer to be coated exposed through the pores in the coating layer as a percentage of the total coated area. In some embodiments of the present application, the average particle diameter (Dv50) of the second cathode active material: the average particle diameter (Dv50) of the first cathode active material is from about 1:1 to about 40:1. The smaller the particles of the first cathode active material, the smaller the thickness of the first cathode active material layer can be made.

In some embodiments of the present application, the thickness of the first cathode active material layer 12 is from about 0.1 μm to about 20 μm. In some embodiments of the present application, the thickness of the first cathode active material layer 12 is from about 0.5 μm to about 15 μm. In some embodiments of the present application, the thickness of the first cathode active material layer 12 is from about 2 μm to about 8 μm. In particular, the thickness of the first cathode active material layer 12 is not less than the particle size Dv90 of the first cathode active material, thereby ensuring the coverage of the first cathode active material layer 12.

In some embodiments of the present application, the thickness of the first cathode active material layer 12 is less than or equal to the thickness of the insulating layer 14. In some embodiments of the present application, the thickness of the insulating layer 14 is greater than about 0.1 μm to achieve a certain insulating effect. In some embodiments of the present application, the thickness of the insulating layer 14 is from about 8 μm to about 30 μm.

According to some embodiments of the present application, the insulating layer includes at least one of inorganic particles and a polymer, a suitable dispersing agent may also be added, and the dispersing agent includes, but is not limited to, ethanol or acetone, or other surfactants. The inorganic particles are selected from the group consisting of aluminum oxide, silicon dioxide, magnesium oxide, titanium oxide, hafnium oxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide, barium sulfate and combinations thereof; and the polymer is selected from the group consisting of a homopolymer of vinylidene fluoride, a copolymer of vinylidene fluoride, a copolymer of hexafluoropropylene, polystyrene, polyphenylacetylene, sodium poly(vinyl acid), potassium poly(vinyl acid), polymethyl methacrylate, polyethylene, polypropylene, polytetrafluoroethylene and combinations thereof.

According to some embodiments of the present application, the first cathode active material and the second cathode active material are each independently selected from the group consisting of lithium cobaltate, lithium iron phosphate, lithium manganese iron phosphate, sodium iron phosphate, lithium vanadium phosphate, sodium vanadium phosphate, oxy-lithium-vanadium phosphate, oxy-sodium-vanadium phosphate, lithium vanadate, lithium manganate, lithium nickelate, lithium nickel cobalt manganese oxide, lithium-rich manganese-based material, lithium nickel cobalt aluminum oxide, lithium titanate and combinations thereof.

In some embodiments of the present application, the first cathode active material layer 12 and the second cathode active material layer 13 further include a binder, and the binder includes, but is not limited to, one or a combination of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene and styrene butadiene rubber. On the one hand, the binder allows a better adhesion between the active material layer to the cathode current collector, and on the other hand, as the content of the binder increases, the compaction density of the first cathode active material layer 12 lowers. The content of the binder of the first cathode active material layer 12 is from about 1.5 wt % to about 6 wt % based on the total weight of the first cathode active material layer 12, and the content of the binder of the second cathode active material layer 13 is from about 0.5 wt % to about 4 wt % based on the total weight of the second cathode active material layer 13.

In some embodiments of the present application, the first cathode active material layer 12 and the second cathode active material layer 13 may further contain a certain amount of conductive agent. The conductive agent includes, but is not limited to, one or a combination of carbon nanotubes, conductive carbon black, acetylene black, graphene, Ketjen black and carbon fibers. The content of the conductive agent of the first cathode active material layer is from about 0.5 wt % to about 5 wt % based on the total weight of the first cathode active material layer, and the content of the conductive agent of the second cathode active material layer is from about 0.5 wt % to about 5 wt % based on the total weight of the second cathode active material layer.

Further, the first cathode active material layer 12 or the second cathode active material layer 13 may be subjected to some other treatments, or the cathode current collector 11 may be subjected to some treatments, such as roughness treatment, heat treatment, etc. The principle or effect may be to enhance adhesion to the cathode current collector. Although not described in detail in the present application, it is included within the scope of the present application.

In some embodiments of the present application, the first distance and the second distance are disposed at a corner of a side edge of the electrode assembly. In the use of a lithium-ion battery having a wound electrode assembly, the probability of an external force impact (such as nail penetration) on the corner of the side edge of the electrode assembly is much less than the probability on the upper and lower outer layers of the electrode assembly, so that disposing the first distance and the second distance at the corner of the side edge of the electrode assembly can effectively ensure the reliability of the preparation technique and maintain the safety performance of the electrode assembly.

Figure 4A:
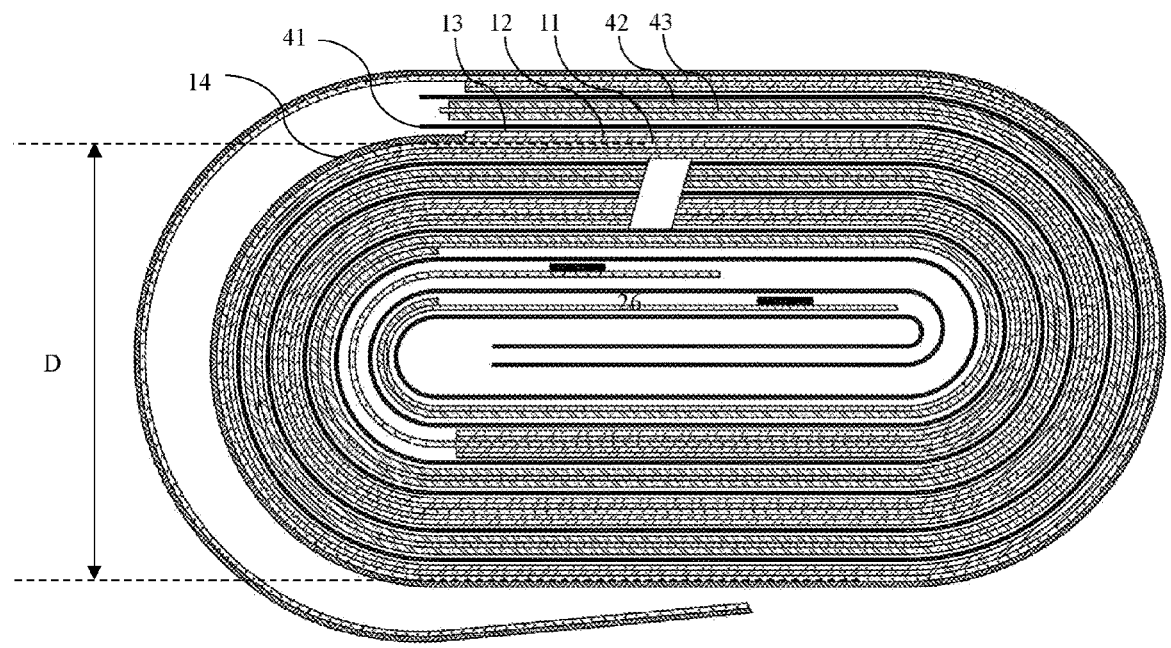
FIG. 4A is a schematic structural diagram of an electrode assembly in which the first distance and the second distance are in the minimum range thereof according to some embodiments of the present application.
Figure 4B:
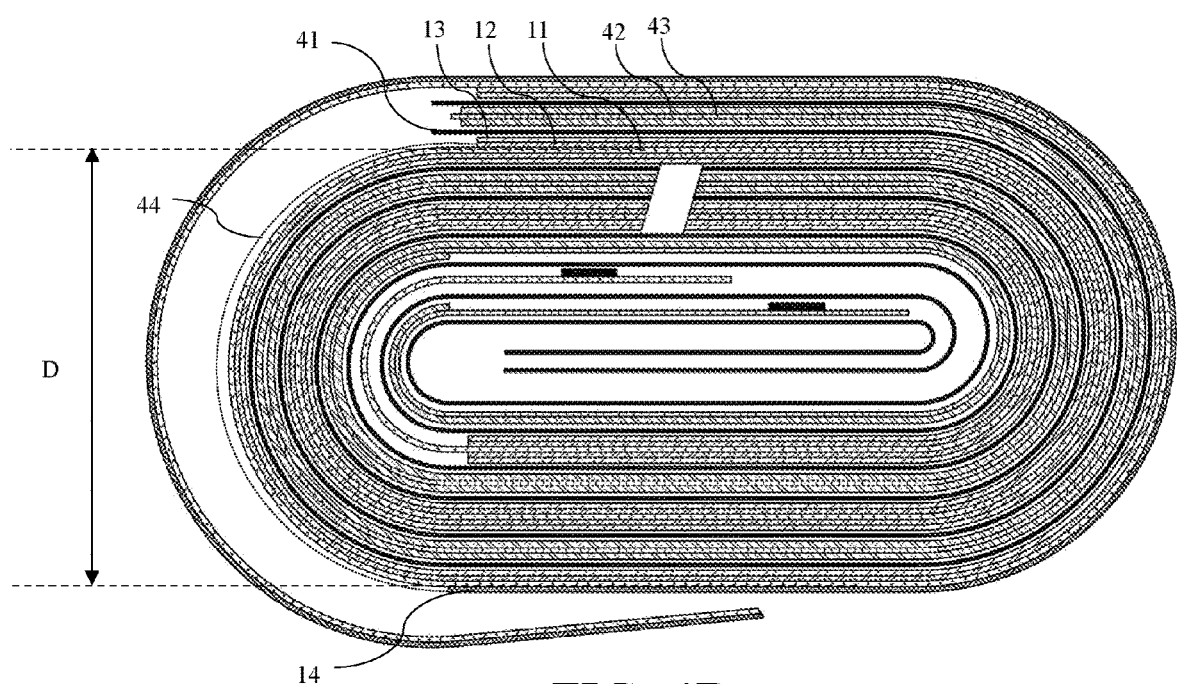
FIG. 4B is a schematic structural diagram of an electrode assembly in which the first distance and the second distance are in the maximum range thereof according to some embodiments of the present application.

FIG. 4A and FIG. 4B are respectively a schematic structural diagram of an electrode assembly in which the first distance and the second distance are the minimum range and maximum range thereof according to some embodiments of the present application. As shown in FIG. 4A, according to the electrode assembly of the lithium-ion battery provided by some embodiments of the present application, the electrode assembly of the lithium-ion battery is in a wound structure, including the cathode, a anode and a separator 41 of the embodiments of the present application, where the anode includes a anode active material layer 42 and an anode current collector 43, and the cathode includes a cathode current collector 11, a first cathode active material layer 12, a second cathode active material layer 13 and an insulating layer 14. The separator is disposed between the anode and the cathode, where a first distance exists between the insulating layer and the first cathode active material layer in the longitudinal direction of the cathode current collector, a second distance exists between the insulating layer and the second cathode active material layer in the longitudinal direction of the cathode current collector, and the first distance and the second distance are respectively equal to 0 (i.e., the minimum value).

As shown in FIG. 4B, in some embodiments of the present application, the first distance having a maximum range 44 is disposed at the corner of the side edge of the electrode assembly, where if the maximum range of the first distance is too large, the excessive exposure of the cathode current collector 11 may be caused, and the first distance may further be beyond the corner of the side edge of the electrode assembly so as to expose the cathode current collector 11 at the upper and lower outer layers of the electrode assembly, so that the protection on the cathode current collector 11 by the insulating layer 14 is lowered, thereby reducing the safety performance and the nail penetration test pass rate of the electrode assembly. In some embodiments of the present application, the maximum range 44 of the first distance and the second distance are correspondingly adjusted according to the thickness D of the electrode assembly, thereby ensuring that the maximum range of the first distance and the second distance at the corner of the side edge of the electrode assembly cannot be beyond the corner of the side edge of the electrode assembly.

The thickness D of the electrode assembly is a distance from the junction between the tail end of the cathode active material layer and the uncovered foil region of the cathode current collector to the outermost uncovered foil region on the opposite side of the electrode assembly.

In some embodiments of the present application, the thickness D of the electrode assembly is from about 1.5 mm to about 50 mm.

In some embodiments of the present application, the first distance 15 between the insulating layer and the first cathode active material layer in the longitudinal direction of the current collector satisfies the following formula:

$$0 \leq \text{the first distance} \leq \frac{\pi}{2}D + 4 \text{ mm.}$$

In some embodiments of the present application, the second distance 16 between the insulating layer and the second cathode active material layer in the longitudinal direction of the current collector satisfies the following formula:

$$0 \leq \text{the second distance} \leq \frac{\pi}{2}D + 4 \text{ mm.}$$

It should be clearly understood by those skilled in the art that 4 mm in the above formula is an allowable error range (i.e., a processing tolerance) of the error generated when the electrode assembly is processed, and the numerical range of the processing tolerance can be adjusted according to the actual operation process without being limited thereto.

The cathode current collector of the cathode in some embodiments of the present application may be aluminum foil or nickel foil, and the anode current collector of the anode may be copper foil or nickel foil. However, other cathode current collectors and anode current collectors commonly used in the art may be used.

The conductive agent and the binder of the anode active material layer in some embodiments of the present application are similar to the conductive agent and the binder of the cathode active material layer described above, and will not be described herein. The anode active material layer includes a anode active material including, but not limited to, selected from the group consisting of carbon materials, metal compounds, oxides, sulfides, nitrides of lithium such as $LiN_3$, lithium metal, metal elements and semimetal elements that form alloys with lithium, polymer materials, and combinations thereof.

In the above anode active materials, examples of the carbon material may include low graphitized carbon, easily graphitizable carbon, artificial graphite, natural graphite, mesophase carbon microspheres, soft carbon, hard carbon, pyrolytic carbon, coke, glassy carbon, organic polymer compound sintered body, carbon fibers and activated carbon, where the coke may include pitch coke, needle coke and petroleum coke. The organic polymer compound sintered body refers to a material obtained by calcining a polymer material such as a phenol plastic or a furan resin at a suitable temperature to carbonize it, and some of these materials are classified into low graphitized carbon or easily graphitizable carbon. Examples of the polymer material may include polyacetylene and polypyrrole.

Further, in the above anode active material, a material whose charging and discharging voltages are close to the charging and discharging voltages of lithium metal is selected. This is because the lower the charging and discharging voltages of the anode active material are, the higher the energy density of the lithium-ion battery is achieved, where the anode active material may be a carbon material because their crystal structures have little change during charging and discharging, and therefore, better cycle performance and greater charging and discharging capacities can be obtained. In particular, graphite may be selected because it can provide a large electrochemical equivalent and a high energy density.

Further, the anode active material may include elemental lithium metal, a metal element and a semimetal element capable of forming an alloy together with lithium (Li), an alloy and a compound including such element, etc. In particular, they are used together with carbon materials to obtain good cycle performance and high energy density. In addition to the alloys including two or more metal elements, the alloys used herein also include alloys containing one or more metal elements and one or more semimetal elements. The alloy may be in the form of a solid solution, a eutectic crystal (eutectic mixture), an intermetallic compound, and a mixture thereof.

Examples of the metal elements and the semimetal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the above alloys and compounds may include a material having a chemical formula: $Ma_sMb_tLi_n$ and a material having a chemical formula: $Ma_pMc_qMd_r$. In these chemical formulae, Ma represents at least one of metal elements and semimetal elements capable of forming an alloy together with lithium; Mb represents at least one of metal elements and semimetal elements other than lithium and Ma; Mc represents at least one of the non-metal elements; Md represents at least one of metal elements and semimetal elements other than Ma; and s, t, u, p, q and r satisfy $s>0$, $t>0$, $u>0$, $p>0$, $q>0$ and $r>0$.

Further, an inorganic compound not including lithium (Li), such as $MnO_2$, $V_2O_5$, $V_6O_{13}$, NiS and MoS, may be used in the anode active material layer.

The separator in some embodiments of the present application includes, but is not limited to, at least one selected from the group consisting of polyethylene, polypropylene, polyethylene terephthalate, polyimide and aramid. For example, the polyethylene includes at least one component selected from the group consisting of high-density polyethylene, low-density polyethylene and ultra-high molecular weight polyethylene. In particular, polyethylene and polypropylene, which have a good effect on preventing short circuits, can improve the stability of the battery in a shutdown event.

The surface of the separator may further include a porous layer, where the porous layer is disposed on at least one surface of the separator, and the porous layer includes inorganic particles and a binder, wherein the inorganic particles are selected from one or more of a combination of aluminum oxide ($Al_2O_3$), silicon oxide ($SiO_2$), magnesium oxide (MgO), titanium oxide ($TiO_2$), hafnium oxide ($HfO_2$), tin oxide ($SnO_2$), cerium dioxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide and barium sulfate. The binder is selected from one or more of a combination of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene and polyhexafluoropropylene.

The porous layer can improve the heat resistance, oxidation resistance and electrolytic solution wettability of the separator, and enhance the binding property between the separator and the cathode or anode.

The lithium-ion battery of the present application further includes an electrolyte, the electrolyte may be one or more of a gel electrolyte, a solid electrolyte and an electrolytic solution, and the electrolytic solution includes a lithium salt and a non-aqueous solvent.

In some embodiments of the present application, the lithium salt is one or more selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, the lithium salt is $LiPF_6$ because it can provide a high ionic conductivity and improve the cycle performance.

The non-aqueous solvent may be a carbonate compound, a carboxylate compound, an ether compound, other organic solvents, or a combination thereof.

The carbonate compound may be a chain carbonate compound, a cyclic carbonate compound, a fluorocarbonate compound, or a combination thereof.

Examples of the chain carbonate compound are diethyl carbonate (DEC), dimethyl carbonate (DMC), dipropyl carbonate (DPC), methylpropyl carbonate (MPC), ethylpropyl carbonate (EPC), methylethyl carbonate (MEC) and combinations thereof. Examples of the cyclic carbonate compound are ethylene carbonate (EC), propylene carbonate (PC), butylene carbonate (BC), vinyl ethylene carbonate (VEC), propyl propionate (PP) and combinations thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate and combinations thereof.

Examples of the carboxylate compound are methyl acetate, ethyl acetate, n-propyl acetate, t-butyl acetate, methyl propionate, ethyl propionate, propyl propionate, γ-butyrolactone, decalactone, valerolactone, mevalonolactone, caprolactone, methyl formate and combinations thereof.

Examples of the ether compound are dibutyl ether, tetraethylene glycol dimethyl ether, diglyme, 1,2-dimethoxyethane, 1,2-diethoxyethane, ethoxy methoxyethane, 2-methyltetrahydrofuran, tetrahydrofuran and combinations thereof.

Examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate and combinations thereof.

In some embodiments of the present application, the cathode, the separator and the anode are sequentially wound or stacked into an electrode assembly, and then loaded into, for example, an aluminum plastic film, the electrolytic solution is injected, and formation and packaging are performed to prepare the lithium-ion battery. Subsequently, the prepared lithium-ion battery is subjected to a performance test, capacity test and nail penetration test.

Those skilled in the art will appreciate that while the above is illustrated with a lithium-ion battery, the electrochemical device of the present application further includes any other suitable electrochemical device. Such an electrochemical device includes any device that generates an electrochemical reaction without departing from the disclosure of the present application, and its specific examples include all kinds of primary batteries, secondary batteries, fuel cells, solar cells, or capacitors. In particular, the electrochemical device is a lithium secondary battery, including a lithium metal secondary battery, a lithium-ion secondary battery, a lithium polymer secondary battery or a lithium-ion polymer secondary battery.

The use of the electrochemical device of the present application is not particularly limited and can be used for any use known in the art. In one embodiment, the electrochemical device of the present application may be used for, but not limited to, a notebook computer, a pen input computer, a mobile computer, an e-book player, a portable phone, a portable fax machine, a portable copy machine, a portable printer, stereo headphones, a video recorder, a liquid crystal display television, a portable cleaner, a portable CD player, a mini disk, a transceiver, an electronic notebook, a calculator, a memory card, a portable recorder, a radio, a backup power supply, a motor, a car, a motorcycle, a power bicycle, a bicycle, a lighting fixture, a toy, a game console, a clock, an electric tool, a flash light, a camera, a large household battery, a lithium-ion capacitor and the like.

Some specific embodiments and comparative embodiments are listed below and battery capacity tests and battery nailing tests are separately performed to better illustrate the present application. Those skilled in the art will appreciate that the preparation methods described in the present application are merely exemplary embodiments, and that any other suitable preparation method is within the scope of the present application.

Embodiment 1

Using aluminum foil as a cathode current collector, a layer of small-particle lithium iron phosphate slurry, including the first cathode active material (where the lithium iron phosphate had a particle size of Dv50: 3 μm and Dv90: 10 μm), was uniformly coated on the surface of the aluminum foil. The lithium iron phosphate slurry, composed of 95.8 wt % of lithium iron phosphate ($LiFePO_4$), 2.8 wt % of polyvinylidene fluoride (PVDF) and 1.4 wt % of conductive carbon black, was dried at 85° C. to form a first cathode active material layer; a layer of aluminum oxide slurry was coated at a position 3 mm away from the first cathode active material layer in the longitudinal direction of the cathode current collector (i.e., the first distance was 3 mm), and the aluminum oxide slurry, composed of 98 wt % of aluminum oxide ($Al_2O_3$) and 2 wt % of polyvinylidene fluoride (PVDF) was dried at 85° C. to form an insulating layer having a thickness of 15 μm; then a layer of lithium cobaltate slurry (slurry of a second cathode active material layer) was coated on the dried first cathode active material layer, and the lithium cobaltate slurry, composed of 97.8 wt % of lithium cobaltate (LCO) (where the lithium cobaltate had a particle size of Dv50: 13 μm and Dv90: 38 μm), 0.8 wt % of polyvinylidene fluoride (PVDF) and 1.4 wt % of conductive carbon black, was dried at 85° C. to form the second cathode active material layer, the distance of the tail end of the second cathode active material layer in the longitudinal direction of the cathode current collector beyond the first cathode active material layer being 3 mm and not covering the insulating layer (i.e., the second distance was 0 mm); and then the first cathode active material layer and the second cathode active material layer were cold-pressed, where the cold pressing pressure was 60T and the cold pressing speed was 40 m/min, and after cutting and slitting, the first cathode active material layer and the second cathode active material layer were dried at 85° C. under vacuum for 4 hours to obtain a cathode, where the thickness of the first cathode active material layer was 8 μm and the thickness of the second cathode active material layer was 50 μm.

Using copper foil as an anode current collector, a layer of graphite slurry, composed of 97.7 wt % of artificial graphite, 1.3 wt % of sodium carboxymethyl cellulose (CMC) and 1.0 wt % of styrene butadiene rubber (SBR), was uniformly coated on the surface of the copper foil, dried at 85° C., and subjected to cold pressing, cutting and slitting to obtain a anode.

A solution prepared from a lithium salt $LiPF_6$ and a non-aqueous organic solvent (ethylene carbonate (EC):diethyl carbonate (DEC):propylene carbonate (PC):propyl propionate (PP):vinylene carbonate (VC)=20:30:20:28:2, mass ratio) in a mass ratio of 8:92 was used as an electrolytic solution of the lithium-ion battery.

The cathode and the anode were wound, and separated by a polyethylene separator, so as to prepare a wound electrode assembly, where the first distance and the second distance were disposed at the corner of the side edge of the electrode assembly, and the thickness D of the electrode assembly was 3.2 mm. After the electrode assembly was subjected to top side sealing, code spraying, vacuum drying, electrolytic solution injection and high-temperature standing, formation and capacity grading were performed to obtain the finished lithium-ion battery.

Embodiment 2

The preparation method was the same as that of Embodiment 1, except that a layer of aluminum oxide slurry was coated at a position 5 mm away from the first cathode active material layer in the longitudinal direction of the cathode current collector (i.e., the first distance was 5 mm, and the second distance was 2 mm) in Embodiment 2.

Embodiment 3

The preparation method was the same as that of Embodiment 1, except that a layer of aluminum oxide slurry was coated at a position 9 mm away from the first cathode active material layer in the longitudinal direction of the cathode current collector (i.e., the first distance was 9 mm) and the tail end of the second cathode active material layer in the longitudinal direction of the cathode current collector was beyond the tail end of the first cathode active material layer by 5 mm (i.e., the second distance was 4 mm) in Embodiment 3.

Embodiment 4

The preparation method was the same as that of Embodiment 1, except that the thickness of the insulating layer was 10 μm in Embodiment 4.

Embodiment 5

The preparation method was the same as that of Embodiment 1, except that the thickness of the insulating layer was 20 μm in Embodiment 5.

Embodiment 6

The preparation method was the same as that of Embodiment 1, except that the thickness of the insulating layer was 5 μm in Embodiment 6.

Embodiment 7

The preparation method was the same as that of Embodiment 1, except that the thickness of the insulating layer was 1 μm in Embodiment 7.

Embodiment 8

The preparation method was the same as that of Embodiment 2, except that the thickness D of the electrode assembly was 2.8 mm in Embodiment 8.

Embodiment 9

The preparation method was the same as that of Embodiment 2, except that the thickness D of the electrode assembly was 3.6 mm in Embodiment 9.

Embodiment 10

The preparation method was the same as that of Embodiment 2, except that the thickness D of the electrode assembly was 4.8 mm in Embodiment 10.

Embodiment 11

The preparation method was the same as that of Embodiment 1, except that a layer of aluminum oxide slurry was coated at a position 20 mm away from the first cathode active material layer in the longitudinal direction of the cathode current collector (i.e., the first distance was 20 mm) and the tail end of the second cathode active material layer in the longitudinal direction of the cathode current collector was beyond the tail end of the first cathode active material layer by 2 mm (i.e., the second distance was 18 mm) in Embodiment 11.

Embodiment 12

The preparation method was the same as that of Embodiment 1, except that the tail end of the second cathode active material layer in the longitudinal direction of the cathode current collector was shorter than the tail end of the first cathode active material layer by 7 mm (i.e., the second distance was 10 mm) in Embodiment 12.

Embodiment 13

The preparation method was the same as that of Embodiment 1, except that a layer of aluminum oxide slurry was coated at a position 0 mm away from the first cathode active material layer in the longitudinal direction of the cathode current collector and the second cathode active material layer covered a portion of the insulating layer (i.e., the second distance was −3 mm) in Embodiment 13.

Comparative Embodiment 1

Using aluminum foil as a cathode current collector, a layer of small-particle lithium iron phosphate slurry, including the first cathode active material (where the lithium iron phosphate had a particle size of Dv50: 3 μm and Dv90: 10 μm), was uniformly coated on the surface of the aluminum foil. The lithium iron phosphate slurry, composed of 95.8 wt % of lithium iron phosphate ($LiFePO_4$), 2.8 wt % of polyvinylidene fluoride (PVDF) and 1.4 wt % of conductive carbon black, was dried at 85° C. to form a first cathode active material layer; a layer of lithium cobaltate slurry (slurry of a second cathode active material layer) was coated on the dried first cathode active material layer, and the lithium cobaltate slurry, composed of 97.8 wt % of lithium cobaltate (LCO) (where the lithium cobaltate had a particle size of Dv50: 13 μm and Dv90: 38 μm), 0.8 wt % of polyvinylidene fluoride (PVDF) and 1.4 wt % of conductive carbon black, was dried at 85° C. to form the second cathode active material layer, the distance of the tail end of the second cathode active material layer in the longitudinal direction of the cathode current collector beyond the first cathode active material layer being 3 mm; and then the first cathode active material layer and the second cathode active material layer were cold-pressed, where the cold pressing pressure was 60T and the cold pressing speed was 40 m/min, and after cutting and slitting, the first cathode active material layer and the second cathode active material layer were dried at 85° C. under vacuum for 4 hours to obtain a cathode, where the thickness of the first cathode active material layer was 8 μm and the thickness of the second cathode active material layer was 50 μm.

Using copper foil as an anode current collector, a layer of graphite slurry, composed of 97.7 wt % of artificial graphite, 1.3 wt % of sodium carboxymethyl cellulose (CMC) and 1.0 wt % of styrene butadiene rubber (SBR), was uniformly coated on the surface of the copper foil, dried at 85° C., subjected to cold pressing, cutting and slitting, and dried under vacuum at 85° C. for 4 hours to obtain a anode.

A solution prepared from a lithium salt $LiPF_6$ and a non-aqueous organic solvent (ethylene carbonate (EC):diethyl carbonate (DEC):propylene carbonate (PC):propyl propionate (PP):vinylene carbonate (VC)=20:30:20:28:2, mass ratio) in a mass ratio of 8:92 was used as an electrolytic solution of the lithium-ion battery.

The cathode and the anode were wound, and separated by a polyethylene separator, so as to prepare a wound electrode assembly, where the thickness D of the electrode assembly was 3.2 mm. After the electrode assembly was subjected to top side sealing, code spraying, vacuum drying, electrolytic solution injection and high-temperature standing, formation and capacity grading were performed to obtain the finished lithium-ion battery.

After the finished lithium-ion batteries of the above embodiments and comparative embodiments were completed, the capacity, thickness, width and length of the finished products were recorded to determine the volumetric energy density of the lithium-ion battery. The battery capacity test and the battery nail penetration test were subsequently carried out on the finished lithium-ion batteries of the above embodiments and comparative embodiment.

Battery Capacity Test:

The electrochemical device (lithium-ion battery) to be tested was allowed to stand in a 25±3° C. environment for 30 minutes, charged at a constant current of 0.5 C to a voltage of 4.4 V (rated voltage), and then charged at a constant voltage until the charge and discharge rate reached 0.05 C, and then the electrochemical device to be tested was allowed to stand for 30 minutes. The lithium-ion battery to be tested was discharged to 3.0 V at a rate of 0.2 C, and allowed to stand for 30 minutes. Finally, the discharge capacity was taken as the actual battery capacity of the battery.

Lithium-ion battery energy density=discharge capacity/(length*width*thickness of lithium-ion battery).

Battery Nail Penetration Test:

10 electrochemical devices (lithium-ion batteries) to be tested were taken and charged at a constant current of 0.5 C at room temperature to a voltage of 4.4 V, and further charged to a current of 0.05 C at a constant voltage of 4.4 V to a fully charged state of 4.4 V. After that, the lithium-ion battery was subjected to nail penetration under room temperature conditions, where a nail with a diameter of 2.5 mm (steel nail, made of carbon steel, and having a taper of 16.5 mm and a total length of 100 mm) was used for nail penetration at a nail penetration speed of 30 mm/s, and the nail penetration depth was determined by the taper of the steel nail through the lithium-ion battery. Whether the lithium-ion battery produced smoke, fire or explosion was observed. If no smoke, fire or explosion was produced, it was considered that the lithium-ion battery passed the nail penetration test.

The experimental parameters and measurement results of the embodiments and a comparative embodiment are shown in Table 1 below.

TABLE 1

| Group | Positional Relationship between First cathode active material Layer and Second cathode active material Layer | Thickness of Electrode Assembly (mm) | First Distance (mm) | Second Distance (mm) | Thickness of First cathode active material Layer (um) | Thickness of Insulating Layer (um) | Nail Penetration Pass Rate | Energy Density of Lithium-ion Battery (Wh/L) | Whether to Precipitate Lithium |
|---|---|---|---|---|---|---|---|---|---|
| Embodiment 1 | Upper Layer Beyond Lower Layer | 3.2 | 3 | 0 | 8 | 15 | 10/10 | 680 | No |
| Embodiment 2 | Upper Layer Beyond Lower Layer | 3.2 | 5 | 2 | 8 | 15 | 10/10 | 680 | No |
| Embodiment 3 | Upper Layer Beyond Lower Layer | 3.2 | 9 | 4 | 8 | 15 | 10/10 | 680 | No |
| Embodiment 4 | Upper Layer Beyond Lower Layer | 3.2 | 3 | 0 | 8 | 10 | 8/10 | 682 | No |
| Embodiment 5 | Upper Layer Beyond Lower Layer | 3.2 | 3 | 0 | 8 | 20 | 10/10 | 678 | No |
| Embodiment 6 | Upper Layer Beyond Lower Layer | 3.2 | 3 | 0 | 8 | 5 | 7/10 | 683 | No |
| Embodiment 7 | Upper Layer Beyond Lower Layer | 3.2 | 3 | 0 | 8 | 1 | 6/10 | 684 | No |
| Embodiment 8 | Beyond Lower Upper Layer Layer | 2.8 | 5 | 2 | 8 | 15 | 10/10 | 680 | No |
| Embodiment 9 | Upper Layer Beyond Lower Layer | 3.6 | 5 | 2 | 8 | 15 | 10/10 | 680 | No |
| Embodiment 10 | Upper Layer Beyond Lower Layer | 4.8 | 5 | 2 | 8 | 15 | 10/10 | 680 | No |

TABLE 1-continued

| Group | Positional Relationship between First cathode active material Layer and Second cathode active material Layer | Thickness of Electrode Assembly (mm) | First Distance (mm) | Second Distance (mm) | Thickness of First cathode active material Layer (um) | Thickness of Insulating Layer (um) | Nail Penetration Pass Rate | Energy Density of Lithium-ion Battery (Wh/L) | Whether to Precipitate Lithium |
|---|---|---|---|---|---|---|---|---|---|
| Embodiment 11 | Upper Layer Beyond Lower Layer | 3.2 | 20 | 18 | 8 | 15 | 5/10 | 680 | No |
| Embodiment 12 | Lower Layer Beyond Upper Layer | 3.2 | 3 | 10 | 8 | 15 | 8/10 | 678 | Yes |
| Embodiment 13 | Upper Layer Beyond Lower Layer | 3.2 | 0 | −3 | 8 | 15 | 8/10 | 678 | Yes |
| Comparative Embodiment 1 | Upper Layer Beyond Lower Layer | 3.2 | — | — | 8 | 0 | 2/10 | 685 | No |

By comparing Comparative Embodiment 1 and Embodiments 1 to 13, it can be seen that by using the cathode active material layer in a two-layer structure in the region covered by the cathode active material layer and using the insulating layer in the uncovered foil region, the nail penetration test pass rate of the lithium-ion battery can be greatly improved, and the energy density is almost not affected.

By comparing Embodiment 12 and Embodiment 1, it can be seen that when the tail end of the second cathode active material layer in the longitudinal direction of the cathode current collector is shorter than the tail end of the first cathode active material layer, a lithium precipitation phenomenon occurs.

It can be seen from Embodiment 13 and Embodiments 1, 2, 3 and 11 that the covering of the second cathode active material layer and the insulating layer causes the lithium precipitation phenomenon.

It can be seen from Embodiments 1 and 4 to 7 that as the thickness of the insulating layer decreases, the energy density of the lithium-ion battery is slightly increased; however, if the thickness of the insulating layer is too low, the nail penetration pass rate of the lithium-ion battery is lowered.

It can be seen from Embodiments 2 and 8 to 10 that for a lithium-ion battery including electrode assemblies having different thicknesses, the reasonable disposing of the first distance and the second distance significantly enhances the safety performance of the lithium-ion battery without significantly lowering the energy density of the lithium-ion battery and generating the side effect of lithium precipitation.

The above description summarizes the features of several embodiments, which will enable a person of ordinary skill in the art to understand the various aspects of the present application. A person of ordinary skill in the art can readily use this application as a basis for designing or modifying other compositions to achieve the same objectives and/or the same advantages as the embodiments herein. It is also to be understood by a person of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are carried out in a specific order, it should be understood that these operations can be combined, sub- divided, or reordered to form an equivalent method without departing from the teachings of the present application. Therefore, the order and grouping of operations are not a limitation to the present application unless specifically indicated herein.

What is claimed is:

1. A cathode, comprising:
a cathode current collector, having a first surface;
a first cathode active material layer, comprising a first cathode active material;
a second cathode active material layer, comprising a second cathode active material; and
an insulating layer, wherein
the first cathode active material layer is disposed between the cathode current collector and the second cathode active material layer and covers a first portion of the first surface of the cathode current collector, and the insulating layer covers a second portion of the first surface of the cathode current collector that is different from the first portion,
wherein a thickness of the insulating layer is greater than a thickness of the first cathode active material layer.

2. The cathode according to claim 1, wherein a first distance exists between the insulating layer and the first cathode active material layer in a longitudinal direction of the cathode current collector, a second distance exists between the insulating layer and the second cathode active material layer in the longitudinal direction of the cathode current collector; and the first distance and the second distance are respectively greater than or equal to 0 and the second distance is less than or equal to the first distance.

3. The cathode according to claim 2, wherein the first distance is from about 0 mm to about 83 mm.

4. The cathode according to claim 1, wherein the second cathode active material layer completely covers a surface of the first cathode active material layer.

5. The cathode according to claim 1, wherein the thickness of the first cathode active material layer is from about 0.1 μm to about 20 μm.

6. The cathode according to claim 1, wherein the first cathode active material and the second cathode active material are each independently selected from the group consisting of lithium cobaltate, lithium iron phosphate, lithium manganese iron phosphate, sodium iron phosphate, lithium vanadium phosphate, sodium vanadium phosphate, oxy-lithium-vanadium phosphate, oxy-sodium-vanadium phosphate, lithium vanadate, lithium manganate, lithium nickelate, lithium nickel cobalt manganese oxide, lithium-rich manganese-based material, lithium nickel cobalt aluminum oxide, lithium titanate and combinations thereof.

7. The cathode according to claim 1, wherein the first cathode active material layer and the second cathode active material layer each further comprise a binder and a conductive agent, wherein the binder is selected from the group consisting of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene butadiene rubber and combinations thereof; and the conductive agent is selected from the group consisting of carbon nanotubes, conductive carbon black, acetylene black, graphene, Ketjen black, carbon fibers and combinations thereof.

8. The cathode according to claim 1, wherein the insulating layer comprises at least one of inorganic particles and a polymer, wherein the inorganic particles are selected from the group consisting of aluminum oxide, silicon dioxide, magnesium oxide, titanium oxide, hafnium oxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide, barium sulfate and combinations thereof; and the polymer is selected from the group consisting of a homopolymer of vinylidene fluoride, a copolymer of vinylidene fluoride, a copolymer of hexafluoropropylene, polystyrene, polyphenylacetylene, sodium poly(vinyl acid), potassium poly(vinyl acid), polymethyl methacrylate, polyethylene, polypropylene, polytetrafluoroethylene and combinations thereof.

9. An electrochemical device, comprising an anode, a separator and a cathode, wherein the cathode comprises a cathode current collector, having a first surface; a first cathode active material layer, comprising a first cathode active material; a second cathode active material layer, comprising a second cathode active material; and an insulating layer, wherein the first cathode active material layer is disposed between the cathode current collector and the second cathode active material layer and covers a first portion of the first surface of the cathode current collector, and the insulating layer covers a second portion of the first surface of the cathode current collector that is different from the first portion, wherein a thickness of the insulating layer is greater than a thickness of the first cathode active material layer; and the separator is disposed between the anode and the cathode, and the anode, the separator, and the cathode are wound to form an electrode assembly.

10. The electrochemical device according to claim 9, wherein a first distance exists between the insulating layer and the first cathode active material layer in a longitudinal direction of the cathode current collector, a second distance exists between the insulating layer and the second cathode active material layer in the longitudinal direction of the cathode current collector; and the first distance and the second distance are respectively greater than or equal to 0 and the second distance is less than or equal to the first distance.

11. The electrochemical device according to claim 10, wherein the first distance and the second distance are disposed at a corner of the electrode assembly.

12. The electrochemical device according to claim 10, wherein the first distance between the insulating layer and the first cathode active material layer in the longitudinal direction of the cathode current collector satisfies the following formula:

$$0 \leq \text{the first distance} \leq \frac{\pi}{2}D + 4 \text{ mm}.$$

13. The electrochemical device according to claim 10, wherein the second distance between the insulating layer and the second cathode active material layer in the longitudinal direction of the cathode current collector satisfies the following formula:

$$0 \leq \text{the second distance} \leq \frac{\pi}{2}D + 4 \text{ mm}.$$

14. The electrochemical device according to claim 9, wherein a thickness D of the electrode assembly is from about 1.5 mm to about 50 mm.

15. An electronic device, comprising an electrochemical device, wherein the electrochemical device comprises an anode, a separator and a cathode, wherein the cathode comprises a cathode current collector, having a first surface; a first cathode active material layer, comprising a first cathode active material; a second cathode active material layer, comprising a second cathode active material; and an insulating layer, wherein the first cathode active material layer is disposed between the cathode current collector and the second cathode active material layer and covers a first portion of the first surface of the cathode current collector, and the insulating layer covers a second portion of the first surface of the cathode current collector that is different from the first portion, wherein a thickness of the insulating layer is greater than a thickness of the first cathode active material layer; and the separator is disposed between the anode and the cathode, and the anode, the separator, and the cathode are wound to form an electrode assembly.

16. The electronic device according to claim 15, wherein a first distance exists between the insulating layer and the first cathode active material layer in a longitudinal direction of the cathode current collector, a second distance exists between the insulating layer and the second cathode active material layer in the longitudinal direction of the cathode current collector; and the first distance and the second distance are respectively greater than or equal to 0 and the second distance is less than or equal to the first distance.

17. The electronic device according to claim 16, wherein the first distance and the second distance are disposed at a corner of the electrode assembly.

18. The electronic device according to claim 16, wherein the first distance between the insulating layer and the first cathode active material layer in the longitudinal direction of the cathode current collector satisfies the following formula:

$$0 \leq \text{the first distance} \leq \frac{\pi}{2}D + 4 \text{ mm};$$

and
the second distance between the insulating layer and the second cathode active material layer in the longitudinal direction of the cathode current collector satisfies the following formula:

$$0 \leq \text{the second distance} \leq \frac{\pi}{2}D + 4 \text{ mm}.$$

19. The electronic device according to claim 15, wherein a thickness D of the electrode assembly is from about 1.5 mm to about 50 mm.

* * * * *